United States Patent
Krishnan et al.

(10) Patent No.: US 9,182,248 B2
(45) Date of Patent: Nov. 10, 2015

(54) POWER LINE COMMUNICATION NETWORK AND DISCOVERY PROCESS

(71) Applicant: TEXAS INSTRUMENTS INCORPORATED, Dallas, TX (US)

(72) Inventors: Ram Krishnan, Chapel Hill, NC (US); Kumaran Vijayasankar, Dallas, TX (US); Ramanuja Vedantham Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 158 days.

(21) Appl. No.: 14/017,053

(22) Filed: Sep. 3, 2013

(65) Prior Publication Data
US 2014/0072059 A1   Mar. 13, 2014

Related U.S. Application Data

(60) Provisional application No. 61/699,397, filed on Sep. 11, 2012.

(51) Int. Cl.
*H04B 1/00* (2006.01)
*G01D 4/00* (2006.01)
*H04B 3/54* (2006.01)

(52) U.S. Cl.
CPC .............. *G01D 4/002* (2013.01); *H04B 3/54* (2013.01); *H04B 2203/5408* (2013.01); *H04B 2203/5433* (2013.01)

(58) Field of Classification Search
CPC ......... H04L 45/22; H04L 45/28; H04L 45/48; H04L 12/2803; H04L 12/56; H04L 45/02; H04L 2012/2843; H04L 41/12; H04L 43/10; H04L 45/00; H04L 45/34; H04L 12/2832; H04L 41/5032; H04L 45/04; H04L 49/02; H04L 45/023; H04L 45/54; H04L 45/70; H04L 45/123; H04L 45/124; H04L 45/58; H04L 47/125; H04L 49/23; H04W 40/246; H04W 40/30; H04W 40/28; H04W 40/00; H04W 40/24; H04W 40/26; H04W 40/10
USPC .............. 375/219, 257; 340/870.02, 657; 370/351, 392, 349, 471; 700/286, 22, 700/292; 455/402, 73
See application file for complete search history.

(56) References Cited

U.S. PATENT DOCUMENTS

2012/0182881 A1* 7/2012 Ananthakrishnan et al. . 370/244

* cited by examiner

*Primary Examiner* — Rahel Guarino
(74) *Attorney, Agent, or Firm* — John R. Pessetto; Frank D. Cimino (57) ABSTRACT

An apparatus for a power line communication network includes a power line transmitter/receiver, a processor coupled to the power line transmitter/receiver, and memory accessible to the processor. The processor is configured to store a routing table in the memory for routing packets in an upward direction towards a data concentrator (DC). However, no routing table is provided for routing packets in a downward direction away from the DC. Instead of using a routing table to route packets in the downward direction, the processor is configured to employ source routing in the downward direction.

16 Claims, 5 Drawing Sheets

POWER LINE COMMUNICATION NETWORK AND DISCOVERY PROCESS

CROSS-REFERENCE TO RELATED APPLICATION

The present application claims priority to U.S. Provisional Patent Application No. 61/699,397 filed on Sep. 11, 2012; which is hereby incorporated herein by reference.

BACKGROUND

There are several different types of communication networks available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the Powerline-Related Intelligent Metering Evolution (PRIME) standard designed for OFDM-based (Orthogonal Frequency-Division Multiplexing) communications. Another PLC standardization effort includes, for example, the IEEE 1901, HomePlug AV, and ITU-T G.hn (e.g., G.9960 and G.9961) specifications. Automatic Metering Infrastructure (AMI) applications may include smart meter applications such as automatic meter reading. AMI can be used over any networking protocol such as PRIME, IEEE 1901.2, etc.

SUMMARY

Some embodiments are directed to an apparatus for a power line communication network includes a power line transmitter/receiver, a processor coupled to the power line transmitter/receiver, and memory accessible to the processor. The processor is configured to store a routing table in the memory for routing packets in an upward direction towards a data concentrator (DC). However, no routing table is provided for routing packets in a downward direction away from the DC. Instead of using a routing table to route packets in the downward direction, the processor is configured to employ source routing in the downward direction.

Another embodiment is directed to a data concentrator (DC) that includes a power line transmitter/receiver, a processor coupled to the power line transmitter/receiver, and memory accessible to the processor. The processor is configured to store a connectivity table in the memory for routing packets in a downward direction from the DC towards lower level nodes in a power line communication network using source routing.

Yet another embodiment is directed to a discovery method for a power line communication network. The method includes broadcasting, by a data concentrator (DC), a ping request to lower level nodes. Further, based on ping responses from lower level nodes, the method includes transmitting, by the DC a get-neighbors-list request to each such lower level node and constructing a connectivity table, by the DC, based on responses received from the lower level nodes to the get-neighbors-list requests. Further still, the method includes configuring each lower level node responding to the ping request with a source routing table usable only in an upward direction toward the DC.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The term "node" and "meter" are used synonymously herein.

Automatic Metering Infrastructure (AMI) networks are characterized by periodic data traffic initiated by a data concentrator (DC) for each meter in the network. For example, a utility client may expect to poll each meter for data once every hour. If the network has 1000 meters, then each cycle should last at most one hour.

PLC networks may be quite lossy which means that network conditions may vary significantly. Further, routing tables are typically stored at each node to facilitate the routing of packets in a downward direction (i.e., from the DC toward lower level nodes) as well as in the upward direction (i.e., from the lower level nodes towards the DC). Hop-by-hop routing requires nodes/meters close to the DC to be capable of storing routing tables containing a large number of routes. In the worst case scenario, hop-by-hop routing may require each node to include routing entries for all or almost all the nodes/meters in the network.

The illustrative PLC described herein is characterized by one or more or all of the following features:

All traffic is between DC and meters. No inter-meter traffic.
Traffic from DC downward towards a meter is routed using source routing.
Traffic from a meter to the DC is routed hop-by-hop. Each meter preferably has only one entry in its routing table.

This entry is for the DC. The "next hop" in this entry is used to send a packet to the next hop node upwards towards the DC.

There is no level broadcast in the disclosed protocol. That is, all broadcasts preferably are link level, single hop broadcasts. At any time only one single hop broadcast will be underway in the whole network. This will be controlled by the DC.

The DC has information on the whole network. Such information includes information about each node's connectivity with its immediate neighbors. The DC can compute the best path to and from a node given the information it has.

Route setup is not triggered by traffic only. This is a proactive protocol. Route setup preferably is triggered by the DC.

Each node is assumed to have a unique global 48 bit address, and may be assigned a temporary short address by the DC.

FIGS. 1-5 provide an overview of hardware elements of the disclosed embodiments. The above-mentioned protocol will be introduced following the discussion of FIG. 5.

Figure 1:
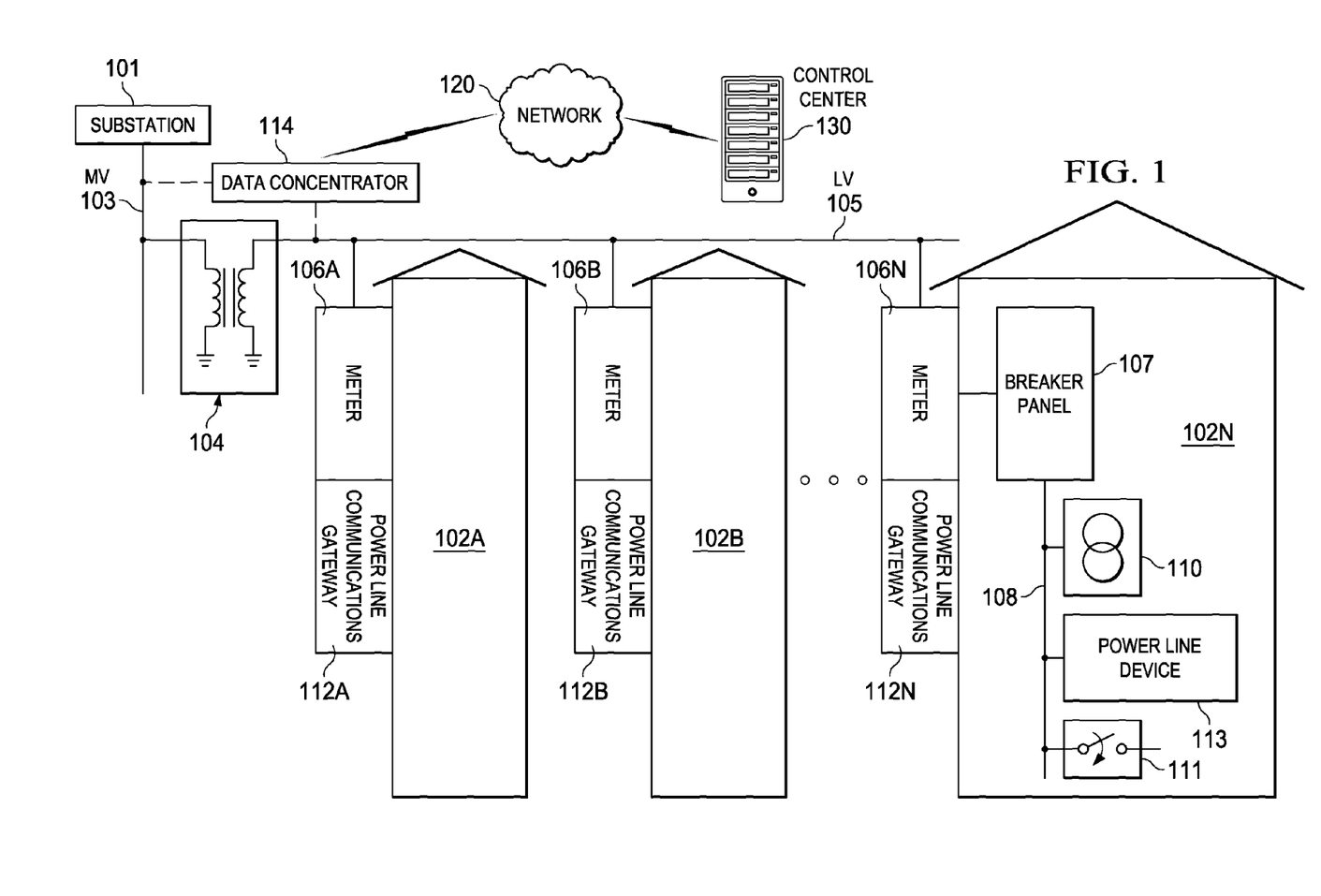
FIG. 1 is a block diagram of a power line communication (PLC) environment according to some embodiments.

Turning now to FIG. 1, an example of an electric power distribution system is shown. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 may operate at low frequencies in the range of 50-60 Hz. Transformer 104 may not allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In some implementations, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
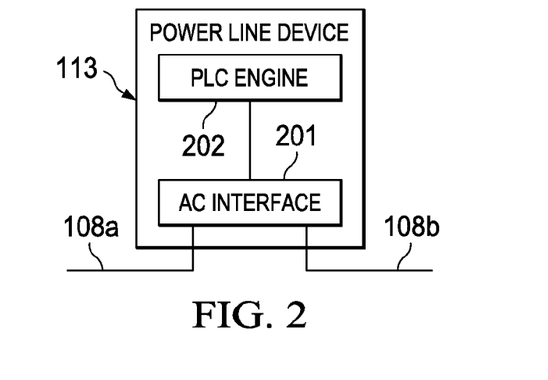
FIG. 2 is a block diagram of a PLC device or modem according to some embodiments.

FIG. 2 is a block diagram of an illustrative PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
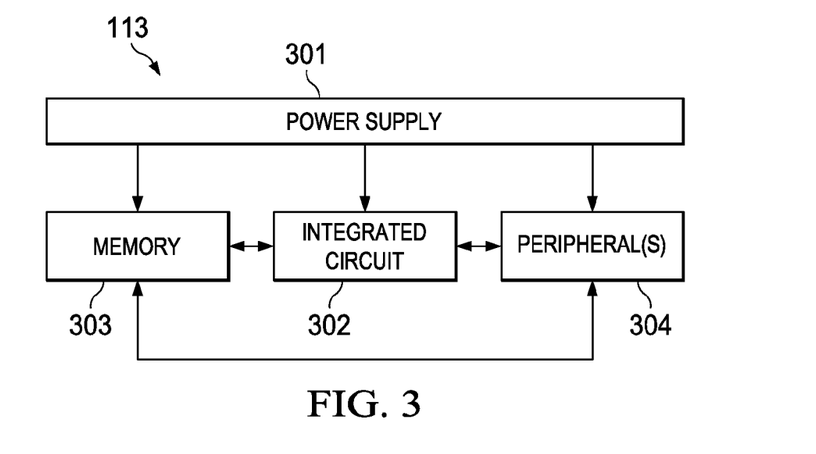
FIG. 3 is a block diagram of an integrated circuit according to some embodiments.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

Figure 4:
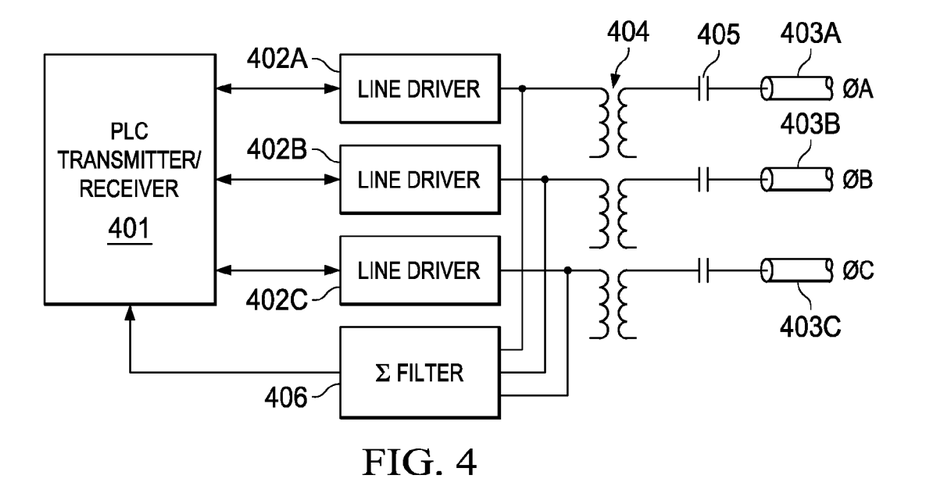
FIG. 4 is a block diagrams illustrating connections between a PLC transmitter and/or receiver circuitry to three-phase power lines according to some embodiments.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

Figure 5:
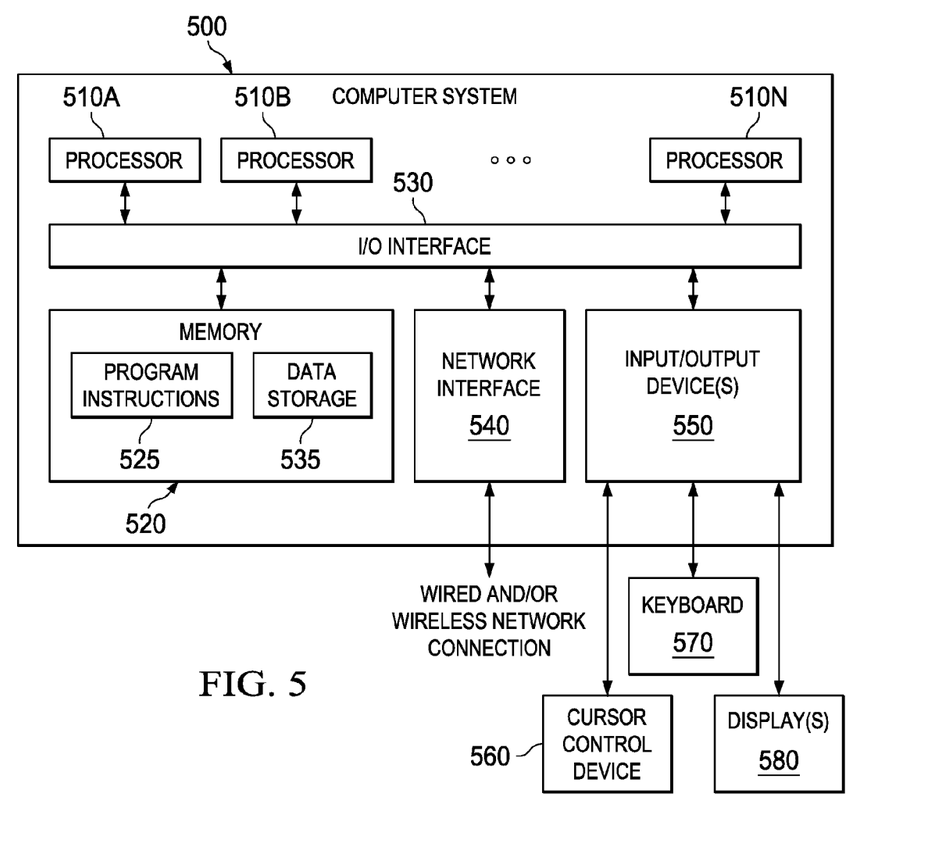
FIG. 5 is a block diagram of a computing system configured to implement certain systems and methods described herein according to some embodiments.

In various embodiments, one or more of the techniques described herein may be executed, at least in part, by one or more communication devices and/or computer systems. One such computer system is illustrated in FIG. 5. In various embodiments, system 500 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 500 includes one or more processors 510 coupled to a system memory 520 via an input/output (I/O) interface 530. Computer system 500 further includes a network interface 540 (coupled to I/O interface 530, and one or more input/output devices, such as cursor control device 560 (e.g., mouse, trackpad, etc.), keyboard 570, and/or display(s) 580.

System memory 520 may be configured to store program instructions and/or data accessible by processor 510. In various embodiments, system memory 520 may be implemented using any suitable type of non-transitory storage device, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 520 as program instructions 525 and data storage 535, respectively. In other embodiments, program instructions and/or data may be received, sent or stored upon different types of computer-accessible media or on similar media separate from system memory 520 or computer system 500. The various operations described herein as attributed to a node of the PLC network may be implemented by the processors 510 executing the program instructions. Generally speaking, a non-transitory, computer-accessible medium may include any tangible storage media or memory media such as magnetic or optical media—e.g., disk or CD/DVD-ROM coupled to computer system 500 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

Network interface 540 may be configured to allow data to be exchanged between computer system 500 and other devices attached to a network, such as other computer systems, or between nodes of computer system 500. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. The network interface is a communications interface and may implement at least some of the power line interface circuitry shown in FIGS. 2-4.

Figure 6:
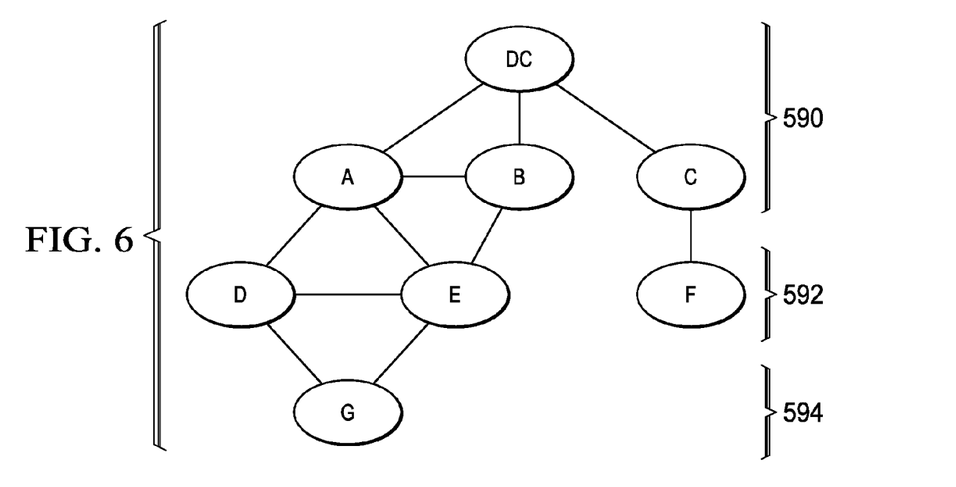
FIG. 6 is a system diagram illustrating nodes in a PLC network.

FIG. 6 is a schematic diagram of nodes in an illustrative PLC subnetwork according to some at least some embodiments. The "root" of the subnetwork is a data concentrator (DC), which may be implemented by the embodiment shown in FIG. 5 and is also shown in FIG. 1 as element 114. The DC is at the root of the network tree and functions as a master node that provides connectivity to the subnetwork.

All other nodes in the network (i.e., nodes A-G in the example of FIG. 6) are lower level nodes and may be referred to as "service" nodes. A service node may communicate directly with the DC (e.g., as in the case of nodes A-C) or may communicate with the DC via other service nodes. A service node may not be able to communicate directly with the base node due to the distance between the service and base nodes, intervening transformers, etc. For example, node D communicates with the DC via node A. Node E communicates with the DC via either nodes A or B. Node G communicates with the DC through any of multiple routes (e.g., G-D-A-DC, G-E-B-DC, G-E-A-DC, etc.). Node F communicates with the DC through only node C. Each of the nodes A-G in FIG. 6 may be implemented in accordance with the embodiments shown in FIGS. 1-5.

Each PLC subnetwork may have one or more "levels" of nodes. FIG. 6 shows an example of a PLC subnetwork containing three levels designated as levels 590, 592, and 594. Level 590 contains first level nodes A, B, and C. Level 592 includes second level nodes D-F, and level 594 includes third level node G. With respect to the DC, all nodes A-G are lower level nodes. With respect to a first level node (e.g., A-C), nodes D-G are lower level nodes. With respect to a second level node (e.g., D-F), node G is a lower level node.

The lines interconnecting the DC and the various lower level nodes in the example of FIG. 6 indicate the communication pathways. Thus, first level nodes A-C are shown as connected to the DC to indicate the DC can exchange packets directly with any of nodes A-C. Node A is shown connected to node B indicating that existence of communication pathway. As such, node G, for example, could send a packet upward towards the DC along the path including nodes E-A-B-DC. The absence of a connecting line between a pair of nodes indicates the absence of a communication path between such nodes.

Figure 7:
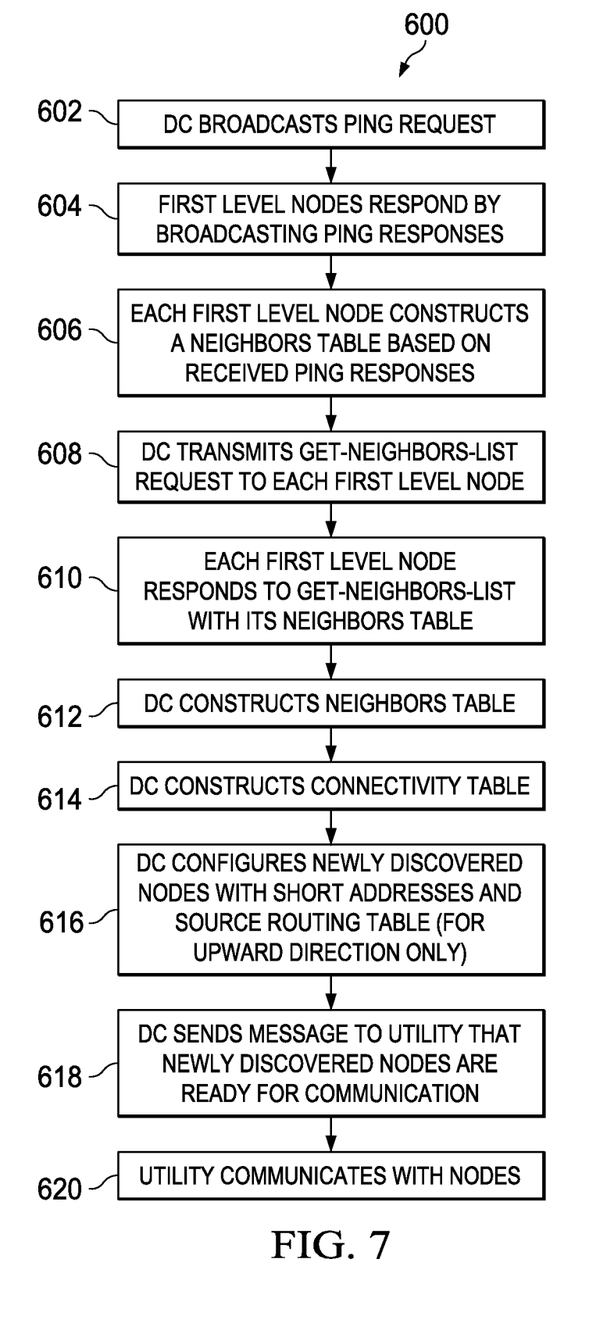
FIGS. 7 and 8 provide flow charts illustrating a discovery method by which a data concentrator discovers the nodes in the PLC network.
Figure 8:
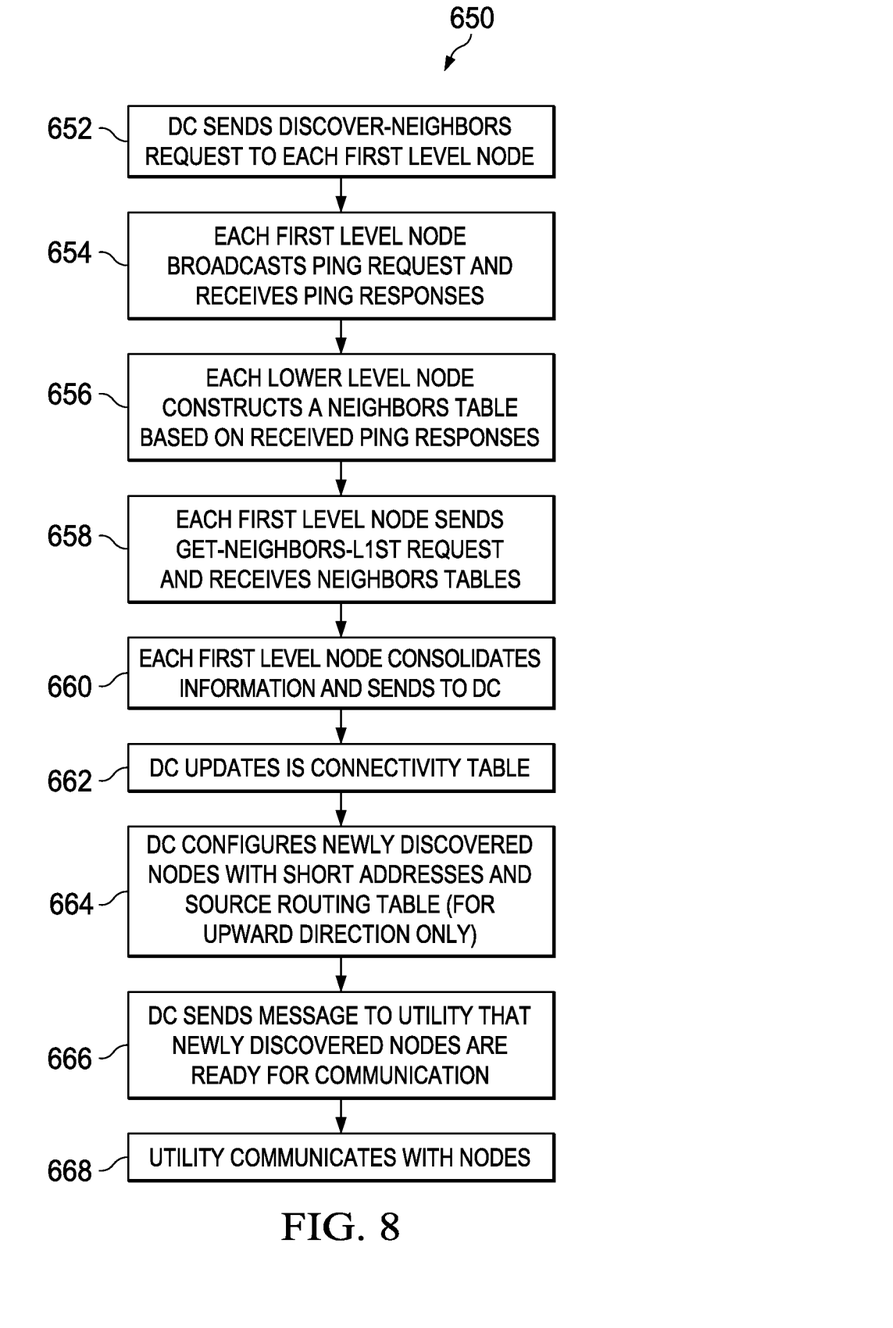

FIGS. 7 and 8 provide an example of a discovery process initiated by the DC. The discovery process includes the use of the messages summarized in Table I below.

TABLE I

| MESSAGE | DESCRIPTION |
| --- | --- |
| PING REQUEST | A single level, broadcasted message requesting recipients to respond with their address |
| PING RESPONSE | A response to a PING REQUEST message that includes the address of the node receiving the PING REQUEST |
| GET-NEIGHORS-LIST | Requests the node receiving this message to respond with that node's neighbors table |
| DISCOVER-NEIGHBORS | Requests the node receiving this message to determine which other nodes are one hop away from the node. |

FIG. 7 illustrates a process 600 by which the DC discovers the first level nodes (e.g., first level 590 nodes A-C in FIG. 6).

At 602, the DC broadcasts a PING REQUEST message. The broadcasted PING REQUEST message is received by all first level nodes that have direct communication capability with the DC (nodes A-C in FIG. 6). Each first level node receiving the PING REQUEST responds at 604 with a broadcast PING RESPONSE. Thus, node A broadcasts its PING RESPONSE to the DC and, due to the communication path between nodes A and B, to node B. Similarly, node B broadcasts its PING RESPONSE to the DC and to node A. Node C sends its PING RESPONSE only to the DC.

At 606, each first level node A-C constructs a "neighbors table" based on the received PING REQUESTS and all, if any, received PING RESPONSES from neighboring nodes. The neighbors table for node A for the example of FIG. 7 is provided below.

| NEIGHBORS TABLE FOR NODE A | | |
| --- | --- | --- |
| Sender Node | Message Count | Average LQI (link quality indicator) |
| DC | N1 | X0 |
| B | N2 | Y0 |

The column labeled "Sender Node" includes the address of the node that sent either a PING REQUEST or a PING RESPONSE to node A, and thus the neighbors of A. As shown in FIG. 6, node A has two neighbors in the same level (first level 590) or a higher level—neighbors DC and B. Other nodes connected o node A (e.g., nodes D and E) have not yet been discovered and thus will not at this time be sent a PING REQUEST nor send a PING RESPONSE. The link quality indicator (LQI) field indicates the quality of the link between two nodes and is measured when a packet is received. The Message Count field indicates the number of messages received from the neighbors over which the LQI was averaged. The greater is the value for the Message Count, the more reliable the LQI is likely to be as it has been averaged over a larger sample set. Similarly, the neighbors tables for nodes B and C are provided below.

| NEIGHBORS TABLE FOR NODE B | | |
| --- | --- | --- |
| Sender Node | Message Count | Average LQI (link quality indicator) |
| DC | M1 | X1 |
| A | M2 | Y1 |

| NEIGHBORS TABLE FOR NODE C | | |
| --- | --- | --- |
| Sender Node | Message Count | Average LQI (link quality indicator) |
| DC | L1 | X2 |

The neighbor table for node B indicates node B has two neighbors—the DC and node A, while the neighbors table for node C indicates node C only has one neighbor at the same or higher level (DC).

At 608, the DC transmits a GET-NEIGHBORS-LIST message to each first level node (i.e., each node that responded with a PING RESPONSE to the DC's initial PING REQUEST). At 610, each first level node A-C responds to the GET-NEIGHBORS-LIST message by transmitting its corresponding neighbors table to the DC.

Based on the various neighbors tables received from the DC's immediate first level nodes (A-C), the DC constructs (operation 612) its own neighbors table as shown below. There are three entries in the DC's neighbors table—one for first level node A, B, and C that are connected to the DC.

| NEIGHBORS TABLE FOR DC | | |
|---|---|---|
| Neighbor | Message Count | Average LQI (link quality indicator) |
| A | K1 | X3 |
| B | K2 | Y3 |
| C | K3 | Z3 |

At 614, the DC also constructs a connectivity table based on the neighbors tables received from nodes A-C as well as the DC's own neighbors table. The DC's connectivity table is shown.

| CONNECTIVITY TABLE FOR DC | | | |
|---|---|---|---|
| Destination | Short Address | Best Down Path | Best Up Path |
| A | 0x1 | DC -> A (Cost - C1) | A -> DC (Cost - C3) |
| B | 0x2 | DC -> B (Cost - C5) | B -> DC (Cost - C7) |
| C | 0x3 | DC -> C (Cost - C9) | C -> DC (Cost - C10) |

The DC's connectivity table includes three entries—one for each node to which the DC directly connects (first level nodes A-C). The column labeled "Best Down Path" specifies the preferred downward direction path (i.e., away from the DC) to each of the nodes that have been discovered by the DC to this point (nodes A-C). Of course, because each of nodes A-C connect directly to the DC, the best down path to each such node is directly from the DC to that node. The "cost" of each path is calculated based on the LQI information provided in the ping response. The cost of a path preferably is computed as the sum of all its link costs. However, the cost metric may be any other metric, in which case the neighbor table shall specify such a link metric. The "Best Up Path" field provides similar information but in the upward direction to the DC from the corresponding node. Each upward path also has a cost value associated with it. The cost of a given path may be the same or different in opposite directions.

Each node in the network may be preconfigured (e.g., from the factory) with an address. In some implementations, the preconfigured address is a globally unique 48-bit address. Globally unique means that no two nodes in the same or different subnetwork have the same address. The globally unique addresses can be used by the DC and the utility attempting to communicate with the various nodes. However, if desired, the DC may configure each node with a "short address" as shown in the "Short Address" field in the DC's connectivity table. As such, the longer, globally unique address may be replaced with a shorter address, which requires less memory for its storage. Preferably, the short address includes enough bits to permit all nodes with a given DC's immediate subnetwork to be addressed. The DC makes the assignments of short addresses to the various nodes.

Referring still to FIG. 7, at 616 the DC configures the newly discovered nodes A-C. In some embodiments, configuring the nodes includes sending a configuration message to each such node including, for example, a short address assigned by the DC to that node. The configuration by the DC of a given node may also include providing the node with a source routing table to be used in the upward direction only (toward the DC from the node). As noted above and in at least some implementations, the source routing table for a given node includes only a single entry specifying the address (e.g., short address) of the next hop node toward the DC. In the case of the first level nodes A-C, the source routing table for each such node simply specifies the address of the DC.

At this point, the DC has discovered its immediate first level nodes (A-C) and has configured them. Such nodes are then ready to receive data communications. At 618, for example, the DC may send a message to the utility service that newly discovered nodes are ready for communication. At 620, the utility may then send communications through the DC to nodes A-C. For example, the utility may request a meter reading from each node.

FIG. 8 provides a preferred discovery process 650 for the DC to discovery nodes at levels below the first level 590. Discovery process 650 preferably is performed for each successive lower level of nodes.

At 652, the DC sends a DISCOVER-NEIGHBORS request to each first level node previously discovered (i.e., nodes A-C in the example of FIG. 6). The DISCOVER-NEIGHBORS request causes the receiving first level node to perform many of the same functions performed by the DC to discover the first level nodes as described above with regard to the discovery process of FIG. 7. Each first level node receiving the DISCOVER-NEIGHBORS request reacts to the received request by broadcasting a PING REQUEST (654). If the first level node has one or more lower level nodes (which would be second level nodes 592 in FIG. 6), then each such lower level node will receive the PING REQUEST and respond with a PING RESPONSE. The PING RESPONSE is broadcasted.

Node D receives a PING REQUES from node A and generates a PING RESPONSE. The PING RESPONSE from node D is provided back to node A and also to node E which is connected to node D on the same level. Node E, however, receives two PING REQUESTS—one each from higher level nodes A and B. Node E thus generates two PING RESPONSES. Each PING RESPONSE from node E is provided to three nodes—higher level nodes A and B as well as node D. Node F only provides a single PING RESPONSE to the PING REQUEST is received from higher level node C.

At 656, each lower level node (D-F) generates its own neighbors table based on the received PING REQUESTS and observed PING RESPONSES as described above. At 658, armed with the knowledge of the lower level nodes that are communicatively connected to each first level node (A-C), each first level node sends a GET-NEIGHBORS-LIST message to each such newly discovered lower level node, and receives the corresponding neighbors tables.

At 660, each higher level (e.g., level 592) node, upon receiving the various neighbors tables from its lower level (e.g., level 594) nodes consolidates such tables and sends the consolidated information to the DC.

At 662, the DC updates its connectivity table. At this point in the example of FIG. 6, the DC has discovered three additional nodes (D, E, and F). An example of an updated connectivity table is shown below.

UPDATED CONNECTIVITY TABLE FOR DC

| Destination | Short Address | Best Down Path | Best Up Path |
|---|---|---|---|
| A | 0x1 | DC -> A (Cost - C1) | A -> DC (Cost - C3) |
| B | 0x2 | DC -> B (Cost - C5) | B -> DC (Cost - C7) |
| C | 0x3 | DC -> C (Cost - C9) | DC -> C (Cost - C10) |
| D | 0x4 | DC -> A->D (Cost - C11) | D->A->DC (Cost - C12) |
| E | 0x5 | DC -> B->E (Cost - C12) | E->B->DC (Cost - C13) |
| F | 0x6 | DC -> C->F (Cost - C14) | F->C->DC (Cost - C15) |

At 664, the DC configures the newly discovered nodes D-F with newly assigned short addresses as well as a single entry source routing table for use only in the upward direction.

At this point, the DC has discovered two level nodes (A-C in level 590 and D-F in level 592) and has configured them. The newly discovered nodes D-F are ready to receive data communications and thus at 666 the DC may send a message to the utility service that newly discovered nodes are ready for communication. At 668, the utility may then send communications through the DC to nodes D-F. For example, the utility may request a meter reading from each node.

The process of FIG. 8 may be repeated for the third level of nodes 594, which in the example of FIG. 6 includes only a single. The interaction in FIG. 8 between nodes at level 590 and 592 is replicated but between levels 592 and 594, and so on. That is, the functions performed by the first level nodes A-C in FIG. 8 are performed the second level nodes D-F as they are commanded to attempt to discover their lower level nodes.

The DC initiates additional rounds of discovery (e.g., using discovery process 650) of lower level nodes until no new nodes are discovered. The lack of responses to PING REQUESTS from all nodes at a particular level indicates that there are no more lower level nodes to discover.

The utility service may inform the DC about the size of the network. When the DC is initially powered up, the DC preferably performs the discovery process frequently until a certain percentage of meters are discovered. Once this threshold is discovered, the DC may reduce the frequency of "discovery & data traffic" cycles and do more "data traffic only" cycles with occasional "discovery & data traffic" cycles in between. In any discovery cycle, if the number of unreachable meters exceeds a threshold, the DC will run a "discovery & data traffic" cycle as the next cycle. Similarly, if a particular meter is unreachable in N consecutive "data traffic only" cycle, the DC will run a "discovery & data traffic" cycle as the next cycle.

The DC may request the utility service to take a meter reading between each process of discovering a level of nodes. Alternatively, the DC may wait to so instruct the utility service until all levels of nodes have been discovered. The DC preferably performs the disclosed discovery process each time the utility service desires to read the various meters.

If a node is not able to send a packet (control or data) to the next hop in the downward direction, the node preferably is required to send a link failure indication to the DC so that the DC can resend the packet through another route if there is one. If there is no other path, the DC will send a routing failure indication to the utility if the packet is a data traffic packet. The DC will not immediately try to find a route to the original destination. The node will hopefully be reachable in the next cycle of, for example, meter reading.

Each node is required to store the next hop to the DC alone. As described above, the DC uses source routing (the entire path information is available in the routing header) when initiating traffic downward to a destination node as the DC knows the entire path via its connectivity table. However, for the reverse/upward direction, each node always send the packet to the next hop for the DC as specified in its single entry source routing table.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for a power line communication network, comprising:
   a power line transmitter/receiver;
   a processor coupled to the power line transmitter/receiver; and
   memory accessible to the processor;
   wherein the processor is configured to store a routing table in the memory for routing packets in an upward direction towards a data concentrator (DC) and wherein no routing table is provided for routing packets in a downward direction away from the DC;
   wherein, instead of using a routing table to route packets in the downward direction, the processor is configured to employ source routing in the downward direction;
   wherein the processor is configured to receive a broadcasted ping request from the DC, to receive ping responses from other nodes that received the broadcasted ping request, and, based on the received responses, if any, construct a neighbors table indicating which of said other nodes are communicatively coupled to the apparatus.

2. The apparatus of claim 1 wherein the processor is configured to respond to a get-neighbors-list request received over the power line transmitter/receiver from the DC by sending the neighbors table to the DC.

3. An apparatus for a power line communication network, comprising:
   a power line transmitter/receiver;
   a processor coupled to the power line transmitter/receiver; and
   memory accessible to the processor;
   wherein the processor is configured to store a routing table in the memory for routing packets in an upward direction towards a data concentrator (DC) and wherein no routing table is provided for routing packets in a downward direction away from the DC;
   wherein, instead of using a routing table to route packets in the downward direction, the processor is configured to employ source routing in the downward direction;
   wherein the processor is configured to receive a discover-neighbors request from the DC and to respond to the received discover-neighbors request by broadcasting a ping request; and
   wherein the processor is configured to receive ping responses from nodes receiving the broadcasted ping request and to send to each node that sent a ping response to the apparatus a get-neighbors-list request requesting each such node to provide information indicating that node's neighboring nodes.

4. A data concentrator (DC), comprising:
a power line transmitter/receiver;
a processor coupled to the power line transmitter/receiver; and
memory accessible to the processor;
wherein the processor is configured to store a connectivity table in the memory for routing packets in a downward direction from the DC towards lower level nodes in a power line communication network using source routing;
wherein the processor is configured to:
broadcast a ping request to lower level nodes;
based on ping responses from lower level nodes, transmit a get-neighbors-list request to each such lower level node;
construct a connectivity table based on responses received from the lower level nodes to the get-neighbors-list request; and
configure each lower level node responding to the ping request with a source routing table usable to transmit packets only in an upward direction toward the DC.

5. The DC of claim 4 wherein the processor is configured to configure each lower level node by providing a shorter address to each such node to be used instead of a longer address pre-configured into the node.

6. The DC of claim 4 wherein the processor is configured to send a discover-neighbors request to each first level node that responded with a ping response to the DC, said discover-neighbors request commanding the first level node to broadcast a ping request.

7. The DC of claim 6 wherein the processor is configured to:
receive information from each first level node indicative of that node's neighboring nodes;
update a connectivity table in the memory based on the received information; and
configure at least some of the neighboring nodes.

8. The DC of claim 7 wherein the processor is configured to configure the at least some neighboring nodes by providing each such node a single entry source routing table to be used only in the upward direction and a shorter address to be used in place of a longer preconfigured globally unique address.

9. A discovery method for a power line communication network, comprising:
broadcasting, by a data concentrator (DC), a ping request to lower level nodes;
based on ping responses from lower level nodes, transmitting, by the DC a get-neighbors-list request to each such lower level node;
constructing a connectivity table, by the DC, based on responses received from the lower level nodes to the get-neighbors-list requests; and
configuring each lower level node responding to the ping request with a source routing table usable only in an upward direction toward the DC.

10. The method of claim 9 wherein configuring each lower level node also includes providing a shorter address to each such node to be used instead of a longer address pre-configured into the node.

11. The method of claim 9 further comprising constructing, by each lower level node, a neighbors table based on ping responses received, if any, from other lower level nodes.

12. The method of claim 9 further comprising sending, by the DC, a message to a utility service to communicate with at least some nodes in the DC's connectivity table.

13. The method of claim 9 further comprising sending, by the DC, a discover-neighbors request to each lower level node that responded with a ping response to the DC, said discover-neighbors request commanding the lower level node to broadcast a ping request.

14. The method of claim 13 further comprising:
sending, by each lower level node receiving a ping response, a get-neighbors-list request to request a neighbors table from each node transmitting a ping response to each lower level node;
receiving a plurality of neighbors tables;
consolidating the received neighbors tables to form consolidated information; and
transmitting the consolidated information to the DC.

15. The method of claim 14 further comprising:
receiving, by the DC, the consolidated information;
updating the connectivity table by the DC based on the received consolidated information; and
configuring, by the DC, at least some nodes specified in the consolidated information.

16. The method of claim 9 further comprising causing a meter reading to occur of the nodes at each level before nodes at a next lower level are discovered by the DC.

* * * * *